(12) United States Patent
Sawada

(10) Patent No.: US 9,751,410 B2
(45) Date of Patent: Sep. 5, 2017

(54) CONTROLLER AND MAP FILE CONVERSION DEVICE

(71) Applicant: FUJI ELECTRIC CO., LTD., Kawasaki-shi (JP)

(72) Inventor: Takao Sawada, Hachioji (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 7 days.

(21) Appl. No.: 14/846,929

(22) Filed: Sep. 7, 2015

(65) Prior Publication Data

US 2015/0375624 A1 Dec. 31, 2015

Related U.S. Application Data

(63) Continuation of application No. PCT/JP2014/059723, filed on Apr. 2, 2014.

(30) Foreign Application Priority Data

Apr. 30, 2013 (JP) ................................. 2013-095383

(51) Int. Cl.
*B60L 3/12* (2006.01)
*G06F 17/30* (2006.01)
(Continued)

(52) U.S. Cl.
CPC ................. *B60L 3/12* (2013.01); *B60L 15/20* (2013.01); *G06F 9/44521* (2013.01);
(Continued)

(58) Field of Classification Search
CPC ................. B60L 3/12; B60L 2240/421; B60L 2240/423; B60L 2250/12; B60L 2250/16;
(Continued)

(56) References Cited

U.S. PATENT DOCUMENTS 6,718,533 B1 * 4/2004 Schneider ................. G06F 8/10
 700/97
7,853,388 B2 * 12/2010 Wang ...................... B60T 7/122
 701/1

(Continued)

FOREIGN PATENT DOCUMENTS

CN 1069354 A 2/1993
EP 0528237 A2 2/1993
(Continued)

*Primary Examiner* — Atul Trivedi
(74) *Attorney, Agent, or Firm* — Rabin & Berdo, P.C.

(57) ABSTRACT

A controller for controlling a drive device that executes drive control of a motor. The controller includes a processing device and a memory having program instructions stored thereon. Execution of the program instructions by the processing device causes the controller to obtain a symbol name provided to indicate data that are an object of reading or updating, to convert the obtained symbol name into an address with reference to a map file, where the map file uses each symbol name included in a source code of a control program as an identifier of the data corresponding to each symbol name, and associates each symbol name with an address of a storage area storing the corresponding data, and to instruct the drive device to read or update the data stored in the storage area indicated by the address obtained through the conversion.

7 Claims, 6 Drawing Sheets

(51) Int. Cl.
  *B60L 15/20* (2006.01)
  *G06F 9/445* (2006.01)
  *G06F 9/455* (2006.01)

(52) U.S. Cl.
  CPC .... *G06F 9/45516* (2013.01); *G06F 17/30076* (2013.01); *B60L 2240/421* (2013.01); *B60L 2240/423* (2013.01); *B60L 2250/12* (2013.01); *B60L 2250/16* (2013.01); *Y02T 10/642* (2013.01); *Y02T 10/7258* (2013.01)

(58) Field of Classification Search
  CPC .... B60L 15/20; Y02T 10/642; Y02T 10/7258; G06F 17/30076
  USPC .......................................................... 701/22
  See application file for complete search history.

(56) References Cited

U.S. PATENT DOCUMENTS

| | | | | |
|---|---|---|---|---|
| 2001/0032038 A1* | 10/2001 | Eiting et al. | ......... | G05B 19/042 701/1 |
| 2002/0199174 A1 | 12/2002 | Tapperson | | |
| 2005/0192950 A1* | 9/2005 | Nomura | ............ | G06F 17/30241 |
| 2007/0050135 A1* | 3/2007 | Nomura | ............. | G01C 21/3611 701/410 |
| 2008/0228712 A1* | 9/2008 | Nomura | ............... | G08G 1/0968 |
| 2010/0094825 A1* | 4/2010 | Kelso | ..................... | G06F 3/061 707/705 |
| 2010/0257507 A1* | 10/2010 | Warren | ..................... | G06F 8/40 717/106 |
| 2010/0332475 A1* | 12/2010 | Birdwell | ........... | G06F 17/30333 707/737 |
| 2014/0309866 A1* | 10/2014 | Ricci | ....................... | B60Q 1/00 701/36 |

FOREIGN PATENT DOCUMENTS

| | | |
|---|---|---|
| JP | S61-279906 A | 12/1986 |
| JP | H05-46377 A | 2/1993 |
| JP | H11-338731 A | 12/1999 |
| JP | 2002-223586 A | 8/2002 |
| JP | 2003-061388 A | 2/2003 |
| JP | 2003-061389 A | 2/2003 |
| JP | 2003-070286 A | 3/2003 |
| JP | 2003-150207 A | 5/2003 |
| JP | 2005-352612 A | 12/2005 |
| JP | 2009-245456 A | 10/2009 |

* cited by examiner

CONTROLLER AND MAP FILE CONVERSION DEVICE

CROSS-REFERENCE TO RELATED APPLICATIONS

This application is a continuation application under 35 U.S.C. 120 of International Application PCT/JP2014/059723 having the International Filing Date of Apr. 2, 2014, and claims the priority of Japanese Patent Application No. JP PA 2013-095383, filed on Apr. 30, 2013. The identified applications are fully incorporated herein by reference.

BACKGROUND OF THE INVENTION

Technical Field

The invention relates to a control technique for a drive device that performs drive control of a motor by controlling the power supplied to the motor.

Background Art

As the interest in environmental issues has been growing in recent years, battery-powered electric automobiles using an onboard battery as a power source (referred to hereinbelow simply as "electric automobiles") have attracted attention. In an electric automobile, a motor such as a three-phase AC motor is installed as a power source. Also installed are a drive device, such as an inverter, that converts the DC power supplied from the onboard battery into AC power and supplies the converted power to the motor, and a controller (VCU (vehicle control unit)) that controls the drive device. The controller adjusts various command values, such as a torque command, which are provided to the drive device, according to a driver's operation, and the drive device adjusts the power, which is supplied to the motor, according to the command value provided from the controller. As a result, the torque or revolution speed of the motor changes and travel control corresponding to the driving operation is realized. Further, the controller acquires, through a signal line, various data (for example, parameter information such as motor constants, or data representing a current value of each phase) that have been stored in the memory of the drive device and also executes the processing of controlling the display of various meters on the basis of those data. As a result, the drive can determine a vehicle state.

BRIEF SUMMARY OF THE INVENTION

Thus, various data are exchanged between the drive device and the controller via the signal line. Further, when the drive device is maintained and inspected, a test device such as a personal computer is connected through the controller to the drive device and various tests, such as the observation of motor behavior when the data stored in the memory of the drive device are referred to or updated, are performed. The access by an external device such as a test device to the data stored in the memory of the drive device has been conventionally realized by assigning a unique function code to each data and specifying the data which are desired to be read from or written into the memory by using the function code. More specifically, a table in which the function codes of the data have been written in association with the header address (referred to hereinbelow simply as "address") of a storage area where the data are to be stored in the memory is stored in the drive device. Then, the drive device is caused to execute the processing of converting the function code provided from the test device as a code specifying the data which are the object of reading or updating into an address with reference to the contents stored in the table, and reading and returning the data stored in the storage area indicated by the address or updating the data.

However, the following problems are associated with the specification of data by the function codes. Firstly, the operation efficiency during maintenance and inspection is poor. Since a function code is mostly assigned as a sequential number, it is difficult to determine which data are represented from the function code, and it is also difficult to cause the tester to analogize the function codes of data which are wished to be read or updated. For this reason, the tester needs to perform various tests while examining, by referring each time to, for example, a manual, which function code has been allocated to the data which are wished to be read or updated. Secondly, each time the data which are the object of reading or updating are appended, modified, and deleted, the table stored in each drive device needs to be updated. Thirdly, an extra processing load is placed on the drive device which is the object of maintenance and inspection due the conversion of the function code to the address, and it is possible that accurate inspection would not be performed.

The present invention has been created to resolve the above-described problems. The present invention provides a technique which is capable of flexibly adapting to addition, modification and deletion of data which are the object of reading or updating, and enables intuitive specification of data which are wished to be read or updated, without applying an extra processing load to a drive device.

In accordance with the present invention, in order to resolve the above-mentioned problems, a map file is stored and the below-described conversion means is provided in a controller that controls a drive device that performs drive control of a motor according to a control program loaded in a memory. In the map file, the address of a storage area where the data are to be stored is written in association with a symbol name (a string representing a variable name) included in a source code of the control program as an identifier for identifying data that are stored in the memory of the drive device when the control program is loaded and executed. The conversion means executes the processing of converting a symbol name provided to indicate the data which are an object of reading or updating to an address with reference to the map file. The controller in accordance with the present invention specifies the data which are the object of reading or object of updating by the address obtained by the conversion means and instructs the drive device to read or update the data.

Specific examples of the controller include a test device that is used when the drive device is maintained or inspected and an onboard controller (the aforementioned VCU). For example, where the present invention is applied to a test device, the tester can specify the data which are wished to be read or updated by using a symbol name. A string such that the meaning of data can be intuitively recognized is most often used as a symbol name corresponding to each data in a source code for a control program. Therefore, in accordance with the present invention, the data which are desired to be read or updated can be specified by the tester by using a symbol name that can be easily intuitively recognized, and the efficiency of maintenance and inspection operations can be increased over the conventional one. Further, in accordance with the present invention, the conversion from the symbol name to the address is executed at the controller side. Therefore, no extra load is applied to the drive device. In addition, by updating the map file on the controller side, it is possible to adapt flexibly to the addition, modification, and deletion of data that are the object of reading or updating.

Japanese Patent Application Publication Nos. S61-279906, 2009-245456, 2005-352612 and 2003-150207 disclose a technique by which a symbol name in the source code of a program is associated with the address of storage destination of data identified by the symbol name, and the access based on the symbol name is enabled. However, the inventions disclosed in these patent literatures do not relate to a technique for controlling the drive device of a motor and are different from the invention of the present application.

The C language is an example of a programming language for describing the source code of the abovementioned control program. A specific feature of the C language is that this language can describe a program executing the processing same as that of the assembler or machine language, for example, can realize flexible memory access based on address specification, but the coding is easier than in the assembler or machine language. For this reason, the C language is widely used for coding of programs for control systems. Where the source code of a control program is described using the C language, in addition to the previously prepared data types such as a char type or a short type, it is possible to define a structure type which is a new data type combining those existing data types, and the variable of this structure type (this variable can be also referred to simply as "structure") can be used. Where the variable of a structure type is used in the source code of a control program, it is preferred that a map file be used in which the address of a storage area for storing data corresponding to constituent elements (referred to hereinbelow as "members") of this structure be written in association with symbol names representing each of the members. Where such a map file is stored in a controller, the data which are the objects of reading or updating can be specified in member units of the structure.

The map file is generated together with an executable file in the process of generating the executable file on the basis of a source code and a header file. However, in such a typical map file, only the address of a storage area for storing data on the structure is written in association with the symbol name of the variable of the structure type, and information relating to the members is not included. Therefore, where the typical map file is used, the data which are the object of reading or updating cannot be specified in the member units of the structure. Accordingly, a map file conversion device may be provided for subjecting the typical map file to map file conversion processing of appending the address of the storage area for the data corresponding to a structure member in association with the symbol name of the member, and the map file subjected to such map file conversion processing may be stored in the controller.

A specific configuration of the map file conversion device may include input means for inputting various data and control means for executing the map file conversion processing. Thus, the source code of the control program of the drive device that performs drive control of a motor, a definition file that defines a data type that has been used in the source code (a header file when the source code is described in the C language), and a map file generated together with the control program on the basis of the source code and definition file are inputted through the input means to the map file conversion device. Where the variable of a structure type is included in the source code received through the input means, the control means executes map file conversion processing of specifying members of the structure with reference to the definition file which has been received through the same input means, and appending an address obtained by adding an offset corresponding to the data type of each preceding member to the address of the storage area in which the structure is stored in the drive device, in association with the symbol name of each member, to the map file received through the same input means.

In another preferred embodiment, version information indicating the version of a control program is stored in advance in the drive device, and the conversion means of the controller acquires the verification information from the drive device and uses a map file corresponding to the version indicated by the version information. For example, an embodiment can be considered in which a plurality of map files with different versions are stored in the controller, and the map file of the versions indicated by the version information acquired from the drive device, which is the control object, is used in the conversion means. Further, a map file itself may be used as the version information. More specifically, a map file of versions corresponding to a control program may be stored in advance together with the control program in the drive device, and the map file may be acquired from the drive device and used in the controller. Where the versions of the control program and map file do not match, the correct address sometimes cannot be obtained by the conversion means, but the occurrence of such an incompatibility can be avoided in the present embodiment.

DETAILED DESCRIPTION OF THE INVENTION

An embodiment of the present invention will be described hereinbelow with reference to the drawings.

Figure 1:
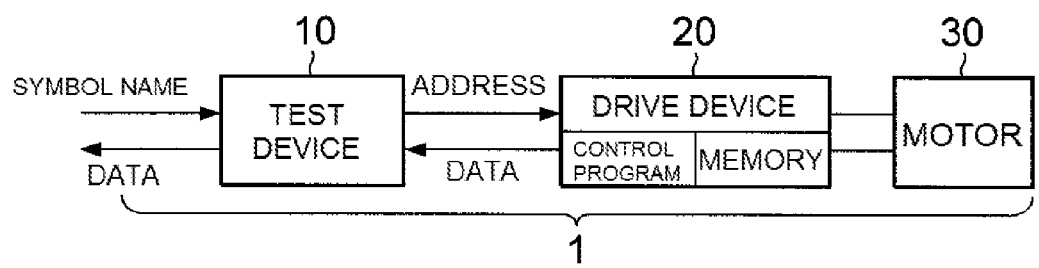
FIG. 1 illustrates a configuration example of a test system 1 including a test device 10 of one embodiment of the controller in accordance with the present invention.

FIG. 1 illustrates a configuration example of a test system 1 including a test device 10 of one embodiment of the controller in accordance with the present invention. The test system 1 serves for maintaining and inspecting a drive device 20 which is installed together with a motor 30 on an electric automobile. As depicted in FIG. 1, the test system 1 includes the drive device 20 which is the object of maintenance and inspection, the motor 30 which is drive-controlled by the drive device 20, and the test device 10 which plays the role of a controller that controls the drive device 20 while the maintenance and inspection are executed.

The motor 30 may be a three-phase AC motor. The drive device 20 is an inverter that converts DC power supply, for example from an onboard battery, into three-phase AC power and supplies the converted power to the motor 30. The drive device 20 includes a control unit (not shown in the figure) which executes, according to a preinstalled control program, the processing of controlling the current value of each phase of a three-phase AC voltage supplied to the motor 30 in response to various commands provided from the controller (VCU in the actual operation; the test device 10 in the present embodiment), and a memory that is used as a work area when the control program is executed.

The control program stored in the drive device 20 is an executable file obtained by performing compiling and linking with respect to a source code that describes in a predetermined programming language the steps in the processing realized according to the control program. In the present embodiment, the C language is used as the programming language for describing the source code. This is because a specific feature of the C language is that this language can describe a program executing the processing same as that of the assembler or machine language, for example, can realize flexible memory access based on address specification, but the coding is easier than in the assembler or machine language, and this language can be advantageously used for coding the programs for control systems.

The test device 10 is, for example, a personal computer and connected to the drive device 20 by a signal line such as a twist-pair cable. In the present embodiment, changes in the operation of the motor 30 are observed by providing various commands from the test device 10 to the drive device 20 through the signal line, or the maintenance and inspection of the drive device 20 are advanced by reading out the data stored in the memory of the drive device 20 and confirming the values thereof.

As mentioned hereinabove, in the conventional technique, the access from an external device to data stored in the memory of the drive device 20 is typically realized by assigning a unique function code to each data and specifying the data which are the object of reading or updating by using the function codes. The difference between the present embodiment and the conventional technique is that in the present embodiment, the tester can specify the data which are the object of reading or updating by using the symbol name of an external variable included in the source code of the control program as an identifier for identifying the data stored in the memory of the drive device 20. The reason why the data, which are the object of reading or updating, are specified by the symbol name is that a symbol name, which allows the meaning of data to be intuitively recognized, is often used in a source code and that the data which are desired to be read or updated can be intuitively specified by the tester without referring each time to, for example, a manual.

Figure 2:
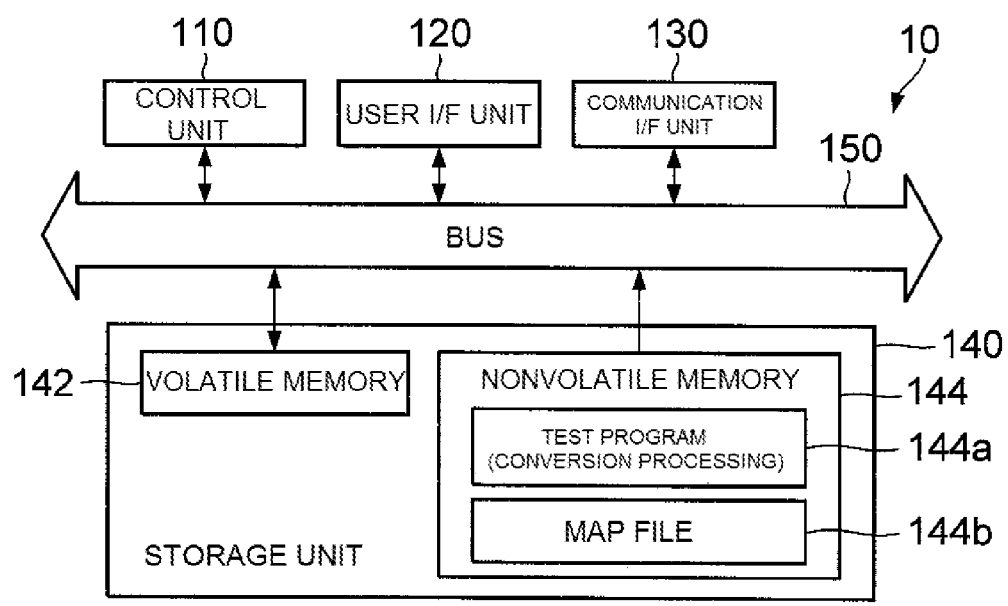
FIG. 2 illustrates a configuration example of the test device 10.

FIG. 2 illustrates a configuration example of the test device 10. As depicted in FIG. 2, the test device 10 has a control unit 110, a user interface (abbreviated hereinbelow as "I/F") unit 120, a communication I/F unit 130, a storage unit 140, and a bus 150 for exchanging data between those constituent elements.

The control unit 110 is, for example, a CPU (Central Processing Unit). The control unit 110 functions as a control center of the test device 10 by executing the test program 144a stored in the storage unit 140 (more accurately, the nonvolatile storage unit 144).

The user I/F unit 120 includes a display unit and an operation unit (none is depicted in FIG. 2). The display unit is constituted by a liquid crystal display and a drive circuit thereof. Various screens for performing the maintenance and inspection of the drive device 20 are displayed, under the control performed by the control unit 110, on the display unit. The operation unit is constituted by a pointing device such as a mouse, or a keyboard. The operation unit allows the tester to perform various input operations for performing the maintenance and inspection of the drive device 20 and provides data corresponding to the contents of the operation performed by the pointing device to the control unit 110. As a result, the contents of operations performed by the tester are transmitted to the control unit 110.

The communication I/F unit 130 is, for example, a NIC (Network Interface Card) and connected to the drive device 20 by a signal line such as a twist-pair cable. The communication I/F unit 130 provides the data received from the drive device 20 through the signal line to the control unit 110, and transmits the data provided from the control unit 110 to the drive device 20 through the signal line.

The storage unit 140 includes a volatile storage unit 142 and a nonvolatile storage unit 144. The volatile storage unit 142 is constituted, for example, by a RAM (Random Access Memory). The volatile storage unit 142 is used by the control unit 110 as a work area when the test program 144a is executed. The nonvolatile storage unit 144 is constituted, for example, by a hard disk or a flash memory. The test program 144a and the map file 144b are stored in advance in the nonvolatile storage unit 144. OS software that configures an OS (Operating System) is also stored, in addition to the test program 144a and the map file 144b, in the nonvolatile storage unit 144. Due to a weak connection with the present invention, this software is not depicted in the figure.

Where the power supply (not depicted in the figure) of the test device 10 is switched on, the control unit 110 reads the OS software from the nonvolatile storage unit 144 into the volatile storage unit 142 and starts the execution thereof. Where the control unit 110 is instructed through the operation unit of the user I/F unit 120 in this state to execute the test program 144a, the control unit reads the test program 144a from the nonvolatile storage unit 144 into the volatile storage unit 142 and starts the execution thereof. The control unit 110 actuated according to the test program 144a displays various screens that support the execution of maintenance and inspection of the drive device 20 on the display unit of the user I/F unit 120. Where a symbol name that indicates data which are the object of reading or updating is inputted by the operation of the operation unit of the user I/F unit 120, the control unit 110 communicates with the drive device 20 in order to read or update the data specified by the symbol name.

More specifically, initially, the control unit 110 executes the conversion processing of converting, by using the map file 144b, the symbol name inputted to indicate the data which are the object of reading or updating to the address of the storage area in the memory of the drive device 20 for the data indicated by the symbol name, notifies through the signal line the drive device 20 of the address obtained by the conversion processing, and specifies the data which are the object of reading or updating. The drive device 20 executes the processing of reading and returning the data stored in the storage area indicated by the address provided in such a manner, or the processing of updating the data stored in this storage area. As a result, the data specified by the tester are read or updated.

In the map file 144b, the address of the storage area for storing the data corresponding to the symbol name in the drive device 20 in which the control program is loaded into the memory and executed is written in association with the symbol name of the external variable included in the source code of the control program. In this case, the symbol name and the address are written in the map file 144*b* in association with each other only with respect to the external variable from among the variables included in the source code, because with respect to the variables other than the external variable, the storage area is dynamically secured in the process of executing the control program and the address to be associated with the symbol name is not fixed.

A map file in which the symbol name of the external variable included in the source code is associated with the address of a storage area for storing the data corresponding to the symbol name is generated together with an executable file when the executable file is built by compiling and linking from the source code and header file. However, the map file 144*b* stored in the nonvolatile storage unit 144 the test device 10 is obtained by subjecting the typical map file to the map file conversion processing with the map file conversion device 40 depicted in FIG. 3, and is not the typical map file generated together with a control program when the control program is built. This is the second feature of the present embodiment.

Figure 3:
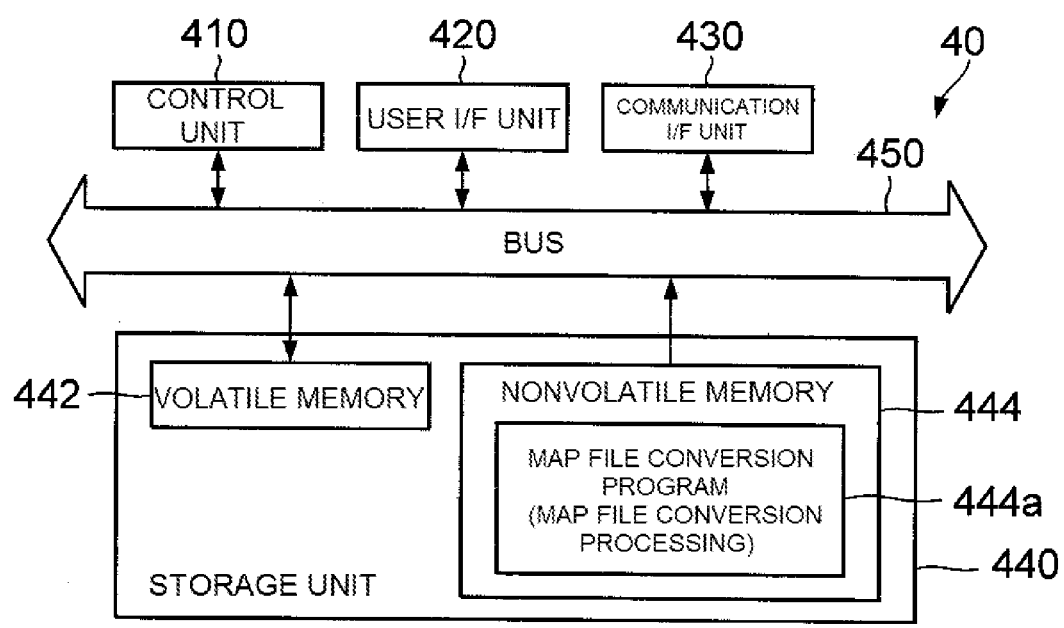
FIG. 3 illustrates a configuration example of a map file conversion device 40 used for generating a map file 144b stored in the test device 10.
Figure 4:
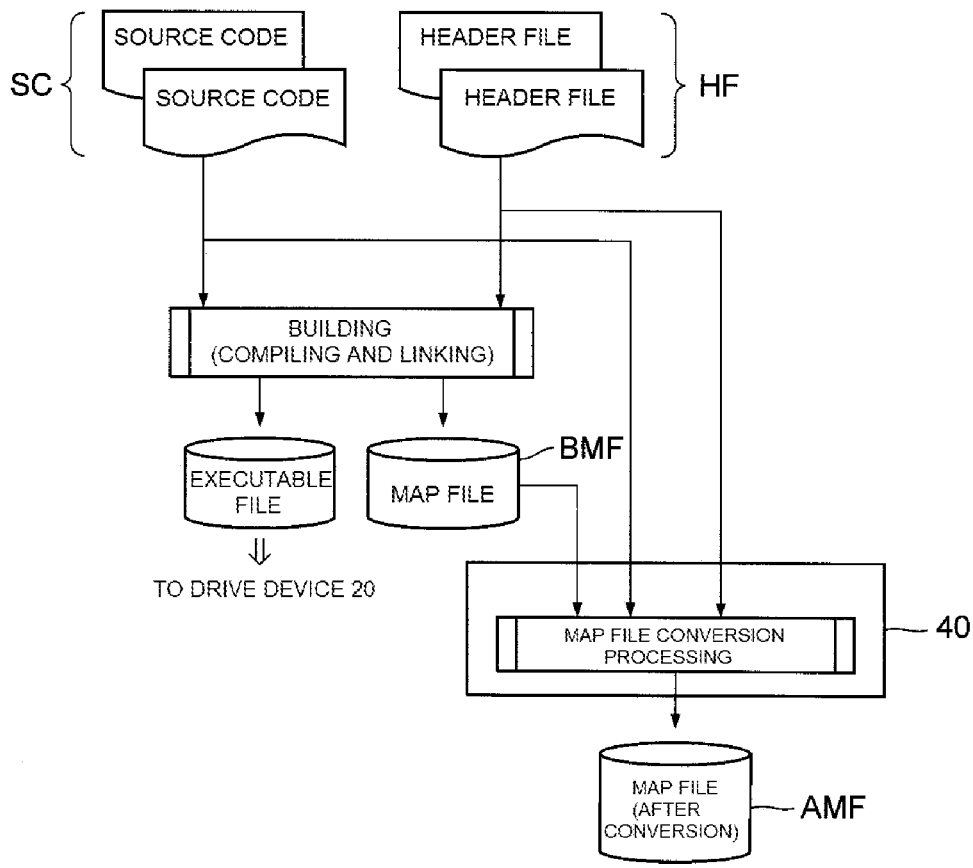
FIG. 4 illustrates a step for generating the map file 144b.
Figure 4:
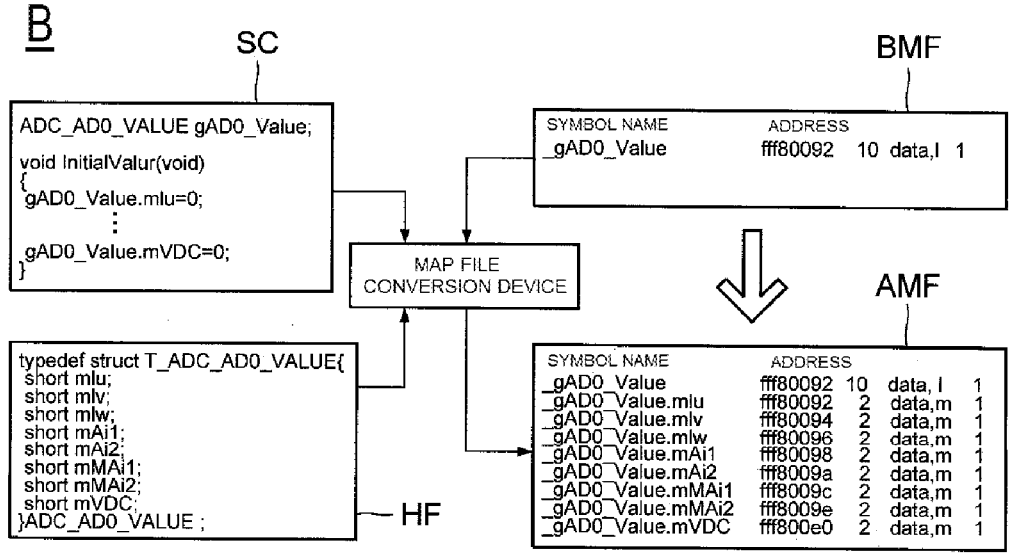

FIG. 3 is a block diagram illustrating a configuration example of the map file conversion device 40. Similarly to the test device 10, the map file conversion device 40 is a personal computer and the hardware configuration thereof is the same as that of the test device 10. Thus, as depicted in FIG. 4, the map file conversion device 40 has a control unit 410, a user I/F unit 420, a communication I/F unit 430, a storage unit 440, and a bus 450 for exchanging data between those constituent elements. The storage unit 440 has a volatile storage unit 442 and a nonvolatile storage unit 444. A map file conversion program 444*a* for realizing the map file conversion processing, which notably represents the feature of the present embodiment, in the control unit 410 is stored in advance in the nonvolatile storage unit 444.

FIG. 4 illustrates the map file conversion processing executed by the control unit 410 according to the map file conversion program 444*a*. More specifically, FIG. 4A illustrates the summary of the map file conversion processing. As depicted in FIG. 4A, in the present embodiment, an executable file is generated by building (compiling and linking) from a source code SC (concerning a specific example, see FIG. 4B) and a header file HF (concerning a specific example, see FIG. 4B) of the control program. The executable file is installed as a control program in the drive device 20. In the abovementioned building process, a typical map file BMF (see FIG. 4B) is generated together with the control program (executable file). The address of the storage area of data corresponding to an external variable included in the source code at the time the executable file is loaded into the memory is written into the map file BMF in association with the symbol name of the external variable.

As depicted in FIG. 4A, in the map file conversion processing of the present embodiment, the source code SC and header file HF of the control program and the map file BMF generated in the process of building the control program are the input data. For example, where a computer device executing the building process is connected by a signal line to the communication I/F unit 430 of the map file conversion device 40, the input data are inputted from the computer device executing the building process to the map file conversion device 40 through the communication I/F unit 430. In other words, the communication I/F unit 430 depicted in FIG. 3 plays the role of an input means for inputting the input data to the map file conversion device 40. In the present embodiment, a map file AMF is generated by executing the map file conversion processing on the basis of those input data, and the map file AMF is stored as the aforementioned map file 144*b* in the nonvolatile storage unit 144 of the test device 10.

Figure 5:
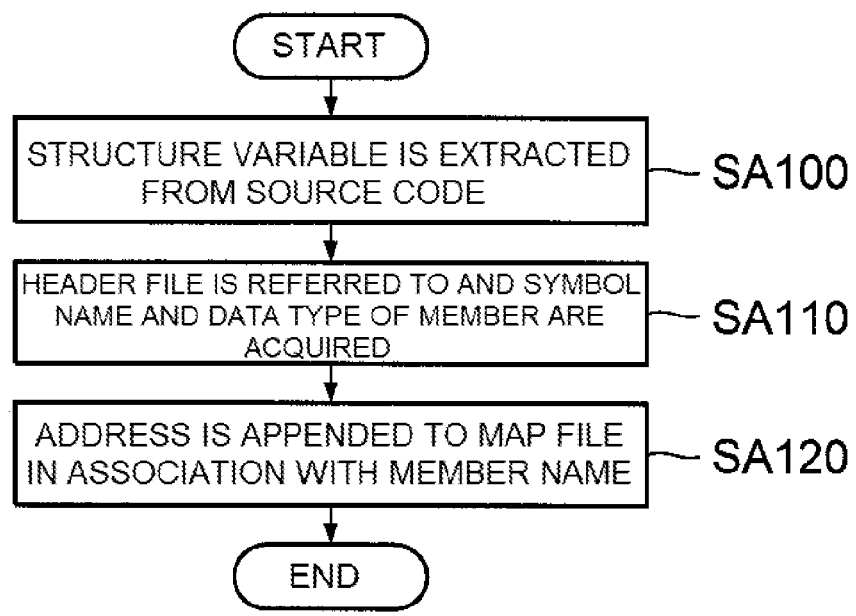
FIG. 5 is a flowchart illustrating the flow of map file generation processing executed by the map file conversion device 40.

FIG. 5 is a flowchart illustrating the flow of map file conversion processing. As depicted in FIG. 5, in the map file conversion processing, the control unit 410 initially extracts the variable of a structure type from among the external variables included in the source code inputted through the communication I/F unit 430 (step SA100). For example, when the source code SC and header file HF depicted in FIG. 4B are inputted, an external variable gAD0_Value of an ADC_AD0_VALUE type (this data type is defined in the header file HF) is included as the external variable of a structure type in the source code SC. Therefore, the external variable g_AD0_Value is extracted in the step SA100. Further, since the external variable g_AD0_Value of the ADC_AD0_VALUE type is an external variable, in the map file BMF in FIG. 4B, the address fff80092 of the storage area for storing the data corresponding to the variable is written in association with the variable name g_AD0_Value of the variable.

Then, the control unit 410 specifies the symbol name and data type of each member of the structure extracted in step SA100 by referring to the header file HF included in the inputted data (step SA110). For example, in the header file HF depicted in FIG. 4B, the structure of the ADC_AD0_VALUE type is defined as being constituted by eight members (mIu, mIv, mIw, mAi1, mAi2, mMAi1, mMAi2, and mVDC) of the respective short type, and a name reflecting the meaning of the data which are to be stored in each of the members is assigned to each of those members. For example, data representing the electric current of a u phase which is supplied from the drive device 20 to the motor 30 is stored in the member mIu, data representing the electric current of a v phase which is supplied from the drive device 20 to the motor 30 is stored in the member mIv, and data representing the electric current of a w phase which is supplied from the drive device 20 to the motor 30 is stored in the member mIw. In the step SA110, (gAD0_Value.mIu, short), (gAD0_Value.mIv, short), (gAD0_Value.mIw, short), (gAD0_Value.mAi1, short), (gAD0_Value.mAi2, short), (gAD0_Value.mMAi1, short), (gAD0_Value.mMAi2, short), and (gAD0_Value.mVDC, short) are extracted as the symbol name and data type of the members of the external variable gAD0_Value.

Further, the control unit 410 appends the address obtained by adding an offset corresponding to the data type of each member preceding the member represented by the symbol name, in association with the symbol name of each member specified in step SA110, to the map file BMF inputted through the communication I/F unit 430 and generates the map file AMF (step SA120). For example, since the member mIu is the first member (that is, there is no preceding member), the offset is 0 and the control unit 410 appends the address (fff80092+0=fff80092) in association with the symbol name (gAD0_Value.mIu) representing this member to the map file BMF. Concerning the member mIv, which is the second member, since the data type of the preceding member (that is, the member mIu) is a short type (2-byte data type), the offset is 2. Therefore, the control unit 410 appends the address (fff80092+2=fff80094) in association with the symbol name (gAD0_Value.mIv) representing the member mIv to the map file BMF. Concerning the member mIw, which is the third member, since the data types of the preceding members (the members mIu and mIv) are each a short type (2-byte data type), the offset is 4. Therefore, the control unit 410 appends the address (fff80092+4=fff80096) in association with the symbol name (gAD0_Value.mIw) representing the member mIw to the map file BMF. Similar processing is performed with respect to the fourth and subsequent members. As a result, the map file AMF depicted in FIG. 4B is obtained. Where a char-type variable is included in the members of the structure, the offset may be calculated by performing the so-called boundary adjustment.

Described hereinabove is the flow of map file conversion processing in the map file conversion device 40. Where no external variable of a structure type is included in the source code inputted to the map file conversion device 40, the map file inputted to the map file conversion device 40 is outputted, as is, as the converted map file.

It is noteworthy that in the present embodiment, the map file (map file AMF depicted in FIG. 4B) subjected to the map file conversion processing with the map file conversion device 40, rather than the typical file (for example, the map file BMF depicted in FIG. 4B) generated together with the control program, is stored in the nonvolatile storage unit 144 of the test device 10. The reason therefor is explained below.

In the typical map file, although the header address of the storage area for storing a structure is written in association with the symbol name of the variable of the structure type, no information relating to the members of the structure is included. Therefore, even though the typical map file is stored in the test device 10, the data which are the object of reading or updating cannot be specified by the symbol name in the member units of the structure. By contrast, in the present embodiment, the map file AMF obtained by the map file conversion processing is stored as the map file 144b in the test device 10. Therefore, the data which are the object of reading or updating can be specified by the tester by the symbol names in the member units of the structure. To enable such specification of the data which are the object of reading or updating in the member units of the structure, in the present embodiment, the map file subjected to the map file conversion processing with the map file conversion device 40 is stored in the test device 10. It goes without saying that when it is not necessary to specify the data which are the object of reading or updating in the member units of the structure, the typical map file may be stored as the map file 144b in the test device 10.

Thus, in the present embodiment, the map file subjected to the map file conversion processing performed by the map file conversion device 40 is stored in the nonvolatile storage unit 144 of the test device 10. For example, when the map file AMF depicted in FIG. 4B is stored as the map file 144b in the nonvolatile storage unit 144 of the test device 10, the tester can refer to or update the current value of the u phase, which is supplied from the drive device 20 to the motor 30, by specifying the symbol name (gAD0_Value.mIu).

Figure 6:
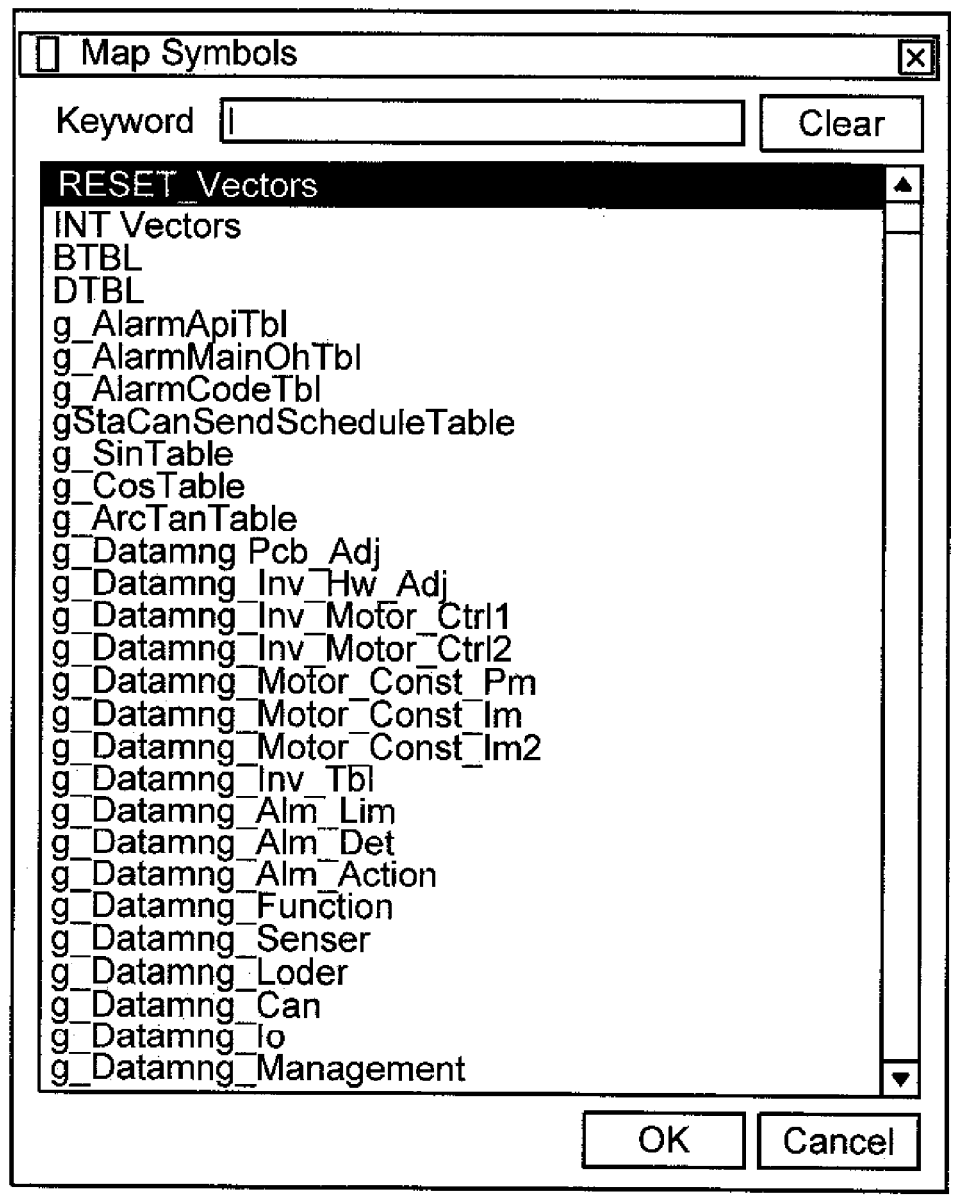
FIG. 6 illustrates an example of a symbol name list displayed on a display unit of a user I/F unit 120 of the test device 10.

Further, the processing of displaying the symbol names, which have been written to the map file 144b, as a list as depicted in FIG. 6 may be executed in the control unit 110, and the tester may be caused to select the symbol name of the data which are wished to be read or updated. As mentioned hereinabove, since the meaning of data corresponding to a symbol name is most often reflected in the symbol name, the tester can intuitively select, without referring to a manual or the like, the symbol name of the data which are wished to be read or updated. Since the data which are wished to be read or updated can be specified by the symbol name, without referring each time to a manual, the present embodiment makes it possible to improve the efficiency of maintenance and inspection operation by comparison with the conventional technique which uses a function code for specification.

As described hereinabove, in the test system 1 of the present embodiment, the tester can specify intuitively the data which are wished to be read or updated, from among the data stored in the memory of the drive device 20, by using a symbol name. Further, in the present embodiment, since the conversion from a symbol name to an address is executed in the test device 10, no extra processing load is applied to the drive device 20. In addition, even when the data which are the object of reading or updating are appended, modified, or deleted, it is possible to adapt flexibly to those operations by updating the map file 144b stored in the test device 10.

One embodiment of the present invention is explained hereinabove, but it goes without saying that this embodiment may be changed in the following manner.

(1) In the embodiment, the map file 144b obtained by executing the map file conversion processing with the map file conversion device 40 with respect to the map file generated in the process of building the control program stored in the drive device 20 is stored in the test device 10. This is because where the version of the control program stored in the drive device 20 and the version of the map file stored in the test device 10 differ from each other (for example, when the version of the source code and header file used when the control program is built and the version of the source code and header file used to generate the map file differ from each other), the correct address is not always obtained by the symbol name/address conversion processing.

However, in most cases, source codes and header files of a plurality of versions are created in response to requests from the user of the drive device 20 (for example, manufacturers of electric automobiles), and a discrepancy often occurs between the version of the control program stored in the drive device 20 and the version of the map file stored in the test device 10. Accordingly, in order to avoid the occurrence of such a discrepancy, it is possible to store version information indicating the version of the control program in the drive device 20, and acquire the version information stored in the drive device 20 and use the map file corresponding to the version indicated by the version information in the test device 10.

For example, a plurality of map files each of which has a different version (map files which have each been subjected to the map file conversion processing by the map file conversion device 40) are stored in the test device 10, and the processing of selecting and using the map file corresponding to the version indicated by the version information acquired from the drive device 20, from among the plurality of map files, is executed in the control unit 110 of the test device 10. The storage destination of the plurality of map files each of which has a different version is not limited to the nonvolatile storage unit 144 of the test device 10 and may be a server device (or a network-adapted hard disk) that can be accessed by the test device 10 through an electric communication circuit such as Internet. Further, a map file obtained by subjecting a map file generated in the process of building the control program to the map file conversion processing by the map file conversion device 40 may be stored as the version information in the drive device 20, the version information (map file) may be acquired from the drive device 20 before the test is started (for example, when the connection of the drive device 20 through a signal line is detected) by the test device 10, and this map file may be used therein.

(2) In the embodiment, an example is explained in which the present invention is applied to a test device for performing the maintenance and inspection of the drive device 20, but it goes without saying that the present invention may be also applied to a test device for performing tests at the development stage of the drive device 20. Further, the present invention may be also applied to a controller that communicates with the drive device 20 and performs the operation control thereof when the drive device 20 is actually used. For example, when the motor 30 and the drive device 20 are installed on an electric automobile, the present invention may be applied to an onboard controller (VCU) that preforms operation control of the drive device 20 in response to the operation performed by the driver of the electric automobile. Further, the application objects of the present invention are not limited to controllers that control drive devices for electric automobiles. The present invention may be also applied to a controller for controlling, for example, a drive device that drives a motor that lifts an elevator or a drive device that drives the motor of an air conditioner.

(3) In the embodiment, the case is explained in which the source code of the control program of the drive device 20 is described using the C language, but it goes without saying that the source code may be described using another programming language, such as C++. Essentially, any programming language may be used that can assign a symbol name reflecting the meaning of data to be stored in the memory of the drive device 20 in the process of executing the control program and can describe the source code using this symbol name.

(4) In the embodiment, the test program 144a that causes the control unit 110 to execute the symbol name/address conversion processing which notably represents the feature of the present invention (in order words, the program that causes the control unit 110 to function as a conversion means for executing the symbol name/address conversion processing) is stored in advance in the nonvolatile storage unit of the test device 10. However, this program may be also written and distributed on a computer-readable recording medium such as a CD-ROM (Compact Disk-Read Only Memory), or may be distributed by downloading through an electric communication circuit such as Internet. This is because by causing the control unit of a typical computer device such as a personal computer to operate according to the program distributed in such a manner, it is possible to cause the computer device to function as the test device 10 of the embodiment. The same is true with respect to the map file conversion program 444a.

The invention claimed is:

1. A controller for controlling a drive device that executes drive control of a motor, comprising:
   a processing device; and
   a memory having program instructions stored thereon, execution of which by the processing device causes the controller
      to obtain a symbol name provided to indicate data that are an object of reading or updating,
      to convert the obtained symbol name into an address with reference to a map file, the map file using each symbol name included in a source code of a control program as an identifier of data corresponding to said each symbol name, and associating said each symbol name with an address of a storage area storing the corresponding data, and
      to instruct the drive device to read or update the data stored in the storage area indicated by the address obtained through the conversion, wherein
   the source code includes a variable of a structure type that has a plurality of members, both the variable and each member thereof having a symbol name associated thereto, and
   the map file includes, for the variable of the structure type, both
      a first address, which is an address of a storage area storing the variable, associated with the symbol name of the variable, and
      a plurality of second addresses respectively associated with the symbol names of the members of the variable, each second address being obtained by adding an offset corresponding to a data type of an immediately-preceding member to the second address corresponding to the immediately-preceding member, or to the first address when no preceding member thereof exists.

2. The controller according to claim 1, wherein
   version information indicating a version of the control program is stored in the drive device; and
   the map file is a map file corresponding to the version indicated by the version information stored in the drive device.

3. The controller of claim 2, wherein the map file is stored as the version information in the drive device, and is retrievable by the controller from the drive device for use in testing of the motor.

4. A map file conversion device, comprising:
   a communication device configured to receive
      a source code of a control program for a drive device to perform drive control of a motor, the source code including a variable of a structure type that has a plurality of members, each member having a symbol name associated thereto and being of a data type,
      a definition file that defines data types used in the source code, including the structure type and the data types of the members thereof, and
      a map file generated together with the control program using the source code and the definition file, the map file including an address of the variable that is an address of a storage area in which the variable is stored in the drive device; and
   a controller including
      a processing device; and
      a memory having program instructions stored thereon, execution of which by the processing device causes the controller
         to receive through the communication device the source code, the definition file and the map file, and
         upon detecting the variable of the structure type from the source code received through the communication device, to execute map file conversion processing by
            specifying the plurality of members of the variable of the structure type with reference to the received definition file, and
            for each of the members, appending to the received map file an address, obtained by adding an offset corresponding to the data type of an immediately-preceding member to an address of the immediately-preceding member, or to the address of the variable when no preceding member thereof exists, in association with the symbol name of said each member.

5. The map file conversion device of claim 4, wherein the map file is stored in the drive device as version information indicating a version of the control program, and is retrievable by the controller from the drive device for use in testing of the motor.

6. A method for a controller to control a drive device of a motor, comprising:

obtaining a source code of a control program of the drive device, the source code including a plurality of variables each having a symbol name, at least one of the variables being of a structure type that has a plurality of members, each member having a symbol name associated thereto and being of a data type;

obtaining a map file that including the plurality of symbol names and a plurality of addresses, each symbol name being mapped to one of the addresses, each address indicating a storage area storing data corresponding to one of the symbol names mapped thereto;

converting the map file by, for each variable of the structure type, specifying the plurality of members in said each variable, and for each member of said each variable, appending to the map file an address, obtained by adding an offset corresponding to the data type of an immediately-preceding member to an address of the immediately-preceding member, or to the address for the symbol name of the variable when no preceding member thereof exists, in association with the symbol name of said each member;

receiving a target symbol name indicating an object of reading or updating;

converting the target symbol name into a target address with reference to the converted map file; and instructing the drive device to read or update data stored at the target address.

7. The method of claim 6, further comprising:

storing the map file in the drive device as version information indicating a version of the control program, and retrieving, by the controller from the drive device, the stored map file for use in testing of the motor.

* * * * *